United States Patent
Nakano (10) Patent No.: US 11,935,304 B2
(45) Date of Patent: Mar. 19, 2024

(54) CALIBRATION SYSTEM, CALIBRATION METHOD, AND CALIBRATION PROGRAM

(71) Applicant: Toyota Jidosha Kabushiki Kaisha, Toyota (JP)

(72) Inventor: Yusuke Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 17/397,363

(22) Filed: Aug. 9, 2021

(65) Prior Publication Data
US 2022/0051028 A1    Feb. 17, 2022

(30) Foreign Application Priority Data

Aug. 11, 2020 (JP) ................................ 2020-135616

(51) Int. Cl.
| | |
|---|---|
| G06V 20/54 | (2022.01) |
| G06T 7/246 | (2017.01) |
| G06T 7/80 | (2017.01) |
| G08G 1/017 | (2006.01) |
| G08G 1/04 | (2006.01) |

(52) U.S. Cl.
CPC ............ *G06V 20/54* (2022.01); *G06T 7/248* (2017.01); *G06T 7/80* (2017.01); *G08G 1/0175* (2013.01); *G08G 1/04* (2013.01); *G06T 2207/30236* (2013.01); *G06T 2207/30241* (2013.01)

(58) Field of Classification Search
CPC .............................. G06V 20/54; G06V 20/58
See application file for complete search history.

(56) References Cited

U.S. PATENT DOCUMENTS

| | | | | |
|---|---|---|---|---|
| 11,557,089 | B1 * | 1/2023 | Choi | .................... G06V 10/761 |
| 2012/0062748 | A1 * | 3/2012 | Ofek | ........................ G06T 7/33 |
| | | | | 348/149 |
| 2018/0050638 | A1 * | 2/2018 | Lee | ........................ H04N 23/90 |
| 2020/0320313 | A1 * | 10/2020 | Huang | ............. G08G 1/096775 |

FOREIGN PATENT DOCUMENTS

JP    2010-127650 A    6/2010

OTHER PUBLICATIONS

Wang, Na "Self-Calibration of Traffic Surveillance Cameras Based on Moving Vehicle Appearance and 3-D Vehicle Modeling" 25th IEEE International Conference on Image Processing. (Year: 2018).*

* cited by examiner

*Primary Examiner* — Molly Wilburn
(74) *Attorney, Agent, or Firm* — Dinsmore & Shohl LLP (57) ABSTRACT

A calibration system includes: a storage unit that stores a reference trajectory of a mobile body in an image of a predetermined traffic environment photographed by an imaging sensor and a reference position in the image; an acquisition unit that acquires a plurality of the images of the traffic environment that are sequentially photographed; a generation unit that generates an estimated trajectory of the mobile body based on position information of the mobile body detected from the plurality of the images; a calculation unit that calculates an amount of positional deviation of the imaging sensor based on the reference trajectory and the estimated trajectory; a correction unit that corrects the reference position by using the amount of positional deviation; and an update unit that updates a position transformation model for transforming a two-dimensional position in the image into a three-dimensional position by using the corrected reference position.

9 Claims, 6 Drawing Sheets

CALIBRATION SYSTEM, CALIBRATION METHOD, AND CALIBRATION PROGRAM

CROSS REFERENCE TO RELATED APPLICATIONS

This application is based upon and claims the benefit of priority from Japanese patent application No. 2020-135616, filed on Aug. 11, 2020, the disclosure of which is incorporated herein in its entirety by reference.

BACKGROUND

The present disclosure relates to a calibration system, a calibration method, and a calibration program.

An infrastructure camera installed to monitor a road is calibrated based on a measured landmark position at the time of the installation. Further, Japanese Unexamined Patent Application Publication No. 2010-127650 discloses a technique related to a system for estimating a position of a mobile body. The technique disclosed in Japanese Unexamined Patent Application Publication No. 2010-127650 performs calibration based on measurement of the surroundings using three distance sensors.

SUMMARY

Incidentally, an infrastructure camera has a problem that when a mechanical deviation occurs due to an influence from outside, the landmark position in an image changes and thus the accuracy of estimation of the position of a mobile body is reduced. In particular, when a displacement of the camera and a change of illumination occur at the same time, this problem becomes pronounced.

The present disclosure has been made in order to solve the above-described problem, and an object thereof is to improve the accuracy of estimation of the position of a mobile body based on an image photographed by an installed camera.

A first exemplary aspect is a calibration system including: a storage unit configured to store a reference trajectory of a mobile body in an image of a predetermined traffic environment photographed by an imaging sensor and a reference position in the image; an acquisition unit configured to acquire a plurality of the images of the traffic environment that are sequentially photographed; a generation unit configured to generate an estimated trajectory of the mobile body based on position information of the mobile body detected from the plurality of the images; a calculation unit configured to calculate an amount of positional deviation of the imaging sensor based on the reference trajectory and the estimated trajectory; a correction unit configured to correct the reference position by using the amount of positional deviation; and an update unit configured to update a position transformation model for transforming a two-dimensional position in the image into a three-dimensional position by using the corrected reference position.

As described above, according to this exemplary aspect, it is possible to properly calculate the amount of positional deviation of the imaging sensor from the reference trajectory before the occurrence of the positional deviation and the estimated trajectory after the occurrence of the positional deviation. Further, by correcting the reference position (the landmark position) using the amount of positional deviation, it is possible to obtain an accurate reference position (a two-dimensional position) at the current angle of view. Therefore, it is possible to adjust (update) the position transformation model from the corrected reference position and the three-dimensional position of the landmark position measured in advance in accordance with the position where the imaging sensor is currently installed. Thus, by using the updated position transformation model, it is possible to accurately transform the two-dimensional position of the mobile body into the three-dimensional position, whereby it is possible to improve the accuracy of estimation of the position of the mobile body.

Further, it is desirable that the calculation unit calculate, when a difference between the reference trajectory and the estimated trajectory is equal to or greater than a predetermined value, the amount of positional deviation. By doing so, when the influence of the positional deviation is relatively large, it is possible to reduce the processing load for estimating the position and improve the accuracy of estimation of the position by updating the positional transformation model, and when the amount of positional deviation is small, it is possible to reduce the processing load for estimating the position by avoiding updating.

Further, the calculation unit may calculate a transformation formula for transforming the reference trajectory into the estimated trajectory as the amount of positional deviation. By doing so, it is possible to more accurately correct the amount of positional deviation.

Further, the generation unit may perform object recognition on each of the plurality of the images to thereby calculate time-series data of the position information of the mobile body, and generate the estimated trajectory from the time-series data. By doing so, it is possible to more accurately calculate position information of the mobile body in the image and generate a more accurate estimated trajectory.

A second exemplary aspect is a calibration method including: an acquisition step of acquiring, by a computer, a plurality of images of a predetermined traffic environment that are sequentially photographed by an imaging sensor; a generation step of generating, by the computer, an estimated trajectory of a mobile body based on position information of the mobile body detected from the plurality of the images; a calculation step of calculating, by the computer, an amount of positional deviation of the imaging sensor based on a reference trajectory of the mobile body in the image of the traffic environment photographed by the imaging sensor and the estimated trajectory; a correction step of correcting, by the computer, a reference position in the image by using the amount of positional deviation; and an update step of updating, by the computer, a position transformation model for transforming a two-dimensional position in the image into a three-dimensional position by using the corrected reference position.

Further, it is desirable that the calculation step include calculating, when a difference between the reference trajectory and the estimated trajectory is equal to or greater than a predetermined value, the amount of positional deviation. By doing so, when the influence of the positional deviation is relatively large, it is possible to reduce the processing load for estimating the position and improve the accuracy of estimation of the position by updating the positional transformation model, and when the amount of positional deviation is small, it is possible to reduce the processing load for estimating the position by avoiding updating.

Further, the calculation step may include calculating a transformation formula for transforming the reference trajectory into the estimated trajectory as the amount of positional deviation. By doing so, it is possible to more accurately calculate position information of the mobile body in the image and generate a more accurate estimated trajectory.

Further, the generation step may include performing object recognition on each of the plurality of the images, thereby calculating time-series data of the position information of the mobile body, and generating the estimated trajectory from the time-series data. By doing so, it is possible to more accurately calculate position information of the mobile body in the image and generate a more accurate estimated trajectory.

A third exemplary aspect is a calibration program for causing a computer to execute: an acquisition step of acquiring a plurality of images of a predetermined traffic environment that are sequentially photographed by an imaging sensor; a generation step of generating an estimated trajectory of a mobile body based on position information of the mobile body detected from the plurality of the images; a calculation step of calculating an amount of positional deviation of the imaging sensor based on a reference trajectory of the mobile body in the image of the traffic environment photographed by the imaging sensor and the estimated trajectory; a correction step of correcting a reference position in the image by using the amount of positional deviation; and an update step of updating a position transformation model for transforming a two-dimensional position in the image into a three-dimensional position by using the corrected reference position.

It can be expected that the second and the third exemplary aspects described above provide advantageous effects similar to those in the case of the first exemplary aspect.

According to the present disclosure, it is possible to improve the accuracy of estimation of the position of a mobile body based on an image photographed by an installed camera.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure including the above-described exemplary aspects is applied will be described hereinafter in detail with reference to the drawings. The same elements are denoted by the same reference symbols throughout the drawings, and redundant descriptions will be omitted as necessary for the sake of clarity.

First Embodiment

Figure 1:
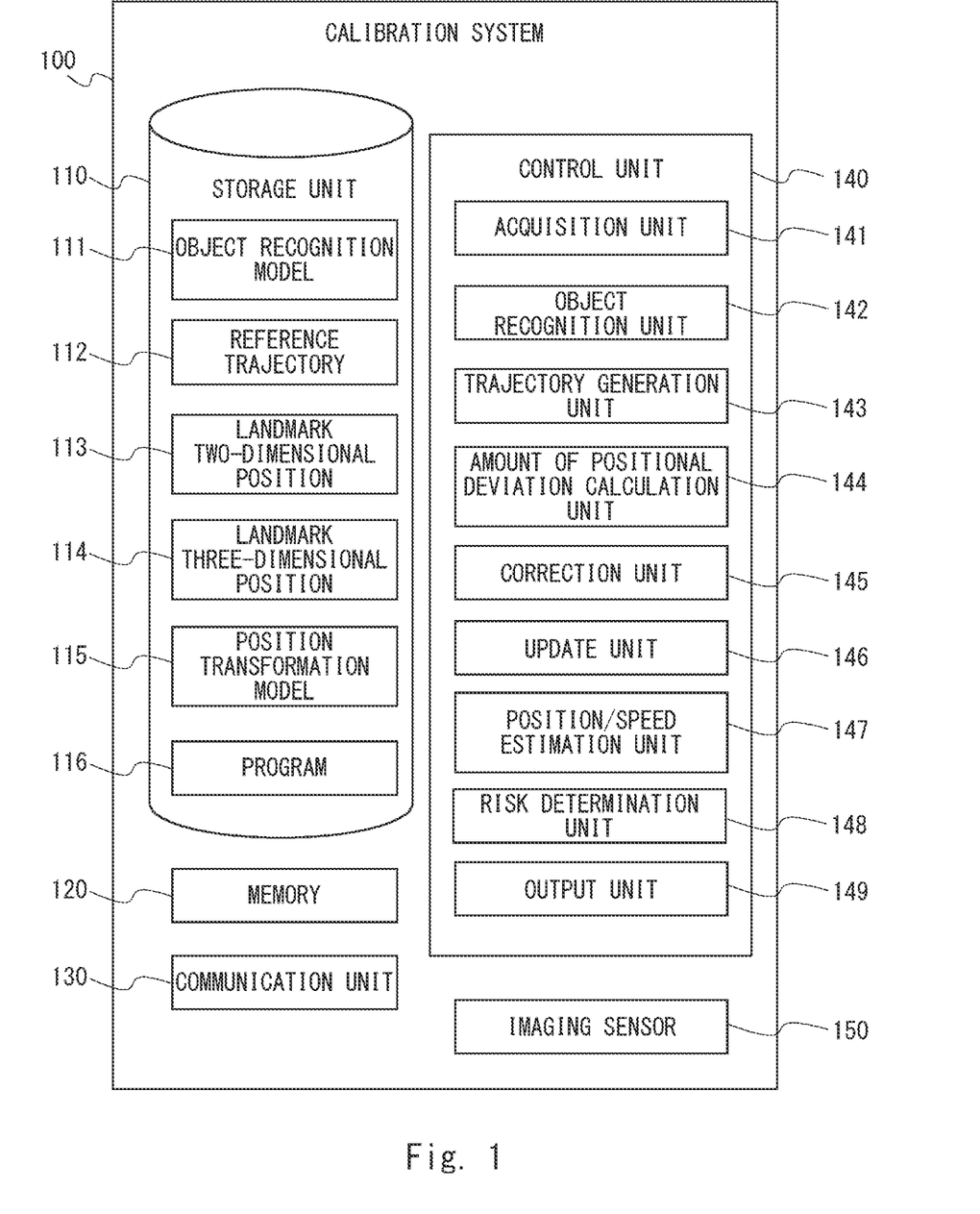
FIG. 1 is a block diagram showing a configuration of a calibration system according to a first embodiment.

FIG. 1 is a block diagram showing a configuration of a calibration system 100 according to a first embodiment. The calibration system 100 includes an infrastructure camera installed in a traffic environment. For example, the calibration system 100 is a monitoring camera apparatus installed along a road. The calibration system 100 is an information system that photographs a predetermined traffic environment, analyzes the photographed image, and outputs a result of a determination of a risk to a vehicle or the like in the traffic environment.

The calibration system 100 includes a storage unit 110, a memory 120, a communication unit 130, a control unit 140, and an imaging sensor 150. The imaging sensor 150 photographs a predetermined traffic environment and outputs the photographed image to the control unit 140. In the following description, the imaging sensor 150 may also be referred to as a camera.

The storage unit 110 is a non-volatile storage device such as a hard disk or a flash memory. The storage unit 110 stores at least an object recognition model 111, a reference trajectory 112, a landmark two-dimensional position 113, a landmark three-dimensional position 114, a position transformation model 115, and a program 116.

The object recognition model 111 is a program module or a model formula in which processing for extracting areas containing vehicles, bicycles, pedestrians, and the like in an input image by extracting and identifying feature values of the input image, and then outputting results of recognition of an object is implemented. For example, the object recognition model 111 uses, as input data, an image photographed by the imaging sensor 150, and uses, as output data, results of recognition such as a type (a vehicle etc.) of a recognized object and position information (an area) in the image by calculating each feature value extracted from the photographed image using a predetermined parameter (a weighting coefficient). The object recognition model 111 is represented by, for example, a neural network. A general object recognition technique such as a deep learning network can be applied to the object recognition model 111. For example, the object recognition model 111 can use a one-stage detector such as Single Shot Multibox Detector (SSD) and M2DET, or a high-precision two-stage detector such as FasterRCNN.

The reference trajectory 112 is a trajectory serving as a reference for a mobile body such as a vehicle in an image of a predetermined traffic environment photographed by the imaging sensor 150. The reference trajectory 112 is information defining a set of coordinates, the respective coordinates being passed through by the mobile body, and a connection relation of a set of coordinates connected to each other in the order of movement. The reference trajectory 112 is information set in the image photographed before the position of the calibration system 100 or the position of the imaging sensor 150 is deviated, for example, at the time of the installation of the calibration system 100 or the imaging sensor 150. The reference trajectory 112 may be past data of the trajectory among estimated trajectories generated after the aforementioned installation. The estimated trajectories will be described later.

The landmark two-dimensional position 113 is an example of a reference position in an image of a predetermined traffic environment photographed by the imaging sensor 150. That is, the landmark two-dimensional position 113 indicates two-dimensional coordinates in the image for a fixed position in the traffic environment. The landmark two-dimensional position 113 is, for example, a street light on a road or four corners of a pedestrian crossing. Therefore, the landmark two-dimensional position 113 may be a set of position information pieces of a plurality of landmarks.

The landmark three-dimensional position 114 indicates three-dimensional coordinates corresponding to the landmark two-dimensional position 113. That is, the landmark three-dimensional position 114 is a practically measured three-dimensional coordinate for the fixed position in the traffic environment. The landmark three-dimensional position 114 may be referred to as an ortho position.

The position transformation model 115 is a program module or a model formula in which processing for transforming a two-dimensional position in an image into a three-dimensional position is implemented. For example, the position transformation model 115 uses position information of a mobile body in the image as an input vector, and uses, as an output vector, position information in the three-dimensional space which is obtained by multiplying the input vector by a predetermined transformation matrix. The position transformation model 115 may use, for example, a homography matrix as the transformation matrix. The position transformation model 115 is newly generated by road camera calibration.

The program 116 is a computer program in which processing for risk prediction including a calibration method according to the first embodiment is implemented.

The memory 120 is a volatile storage device such as a Random Access Memory (RAM), and is a storage area in which information is temporarily held during the operation of the control unit 140. The communication unit 130 is an interface through which the calibration system 100 communicates with the outside.

The control unit 140 is a processor that controls each component of the calibration system 100. The control unit 140 loads the program 116 from the storage unit 110 into the memory 120 and executes the loaded program 116. In this way, the control unit 140 implements the functions of an acquisition unit 141, an object recognition unit 142, a trajectory generation unit 143, an amount of positional deviation calculation unit 144, a correction unit 145, an update unit 146, a position/speed estimation unit 147, a risk determination unit 148, and an output unit 149. These units will be described later.

The acquisition unit 141 acquires the photographed images sequentially photographed by the imaging sensor 150, and outputs the photographed images to the object recognition unit 142 in the order of the acquisition.

The object recognition unit 142 performs image recognition on the photographed image acquired by the acquisition unit 141 and acquires a result of the recognition of a mobile body. The result of the recognition includes position information (two-dimensional coordinates) in the image of the mobile body, the type of the mobile body, and the like. Specifically, the object recognition unit 142 inputs a photographed image to the object recognition model 111, and acquires a result of the object recognition as an output. That is, the object recognition unit 142 detects the mobile body (the position of the mobile body) from the photographed image by object recognition. In other words, the object recognition unit 142 performs object recognition on each of a plurality of images to thereby calculate time-series data of the position information of the mobile body.

The trajectory generation unit 143 generates an estimated trajectory of the mobile body based on position information pieces of the mobile body detected from the plurality of images. Here, the estimated trajectory, like the reference trajectory 112, is information defining a connection relation of a set of coordinates connected to each other in the order of movement, the respective coordinates being passed through by the mobile body. The trajectory generation unit 143 estimates a trajectory along which the mobile body moves in the image from at least a plurality of position information pieces of the mobile body. In other words, the trajectory generation unit 143 generates an estimated trajectory from the time-series data of the position information calculated by the object recognition unit 142. Note that the object recognition unit 142 and the trajectory generation unit 143 are examples of a generation unit.

The amount of positional deviation calculation unit 144 is an example of a calculation unit. The amount of positional deviation calculation unit 144 calculates an amount of positional deviation of the imaging sensor 150 based on the reference trajectory 112 and the estimated trajectory. Further, it is desirable that the amount of positional deviation calculation unit 144 calculate, when the difference between the reference trajectory 112 and the estimated trajectory is equal to or greater than a predetermined value, the amount of positional deviation. By doing so, when the above difference is small, it is possible to control processing of the correction unit 145 and the update unit 146, and thus it is possible to reduce the processing load. Further, the amount of positional deviation calculation unit 144 may calculate a transformation formula for transforming the reference trajectory 112 into the estimated trajectory as the amount of positional deviation. The transformation formula is, for example, a transformation matrix described later.

The correction unit 145 corrects the reference position (the landmark two-dimensional position 113) by using the amount of positional deviation. For example, the correction unit 145 performs correction by multiplying the landmark two-dimensional position 113 by the calculated transformation formula.

The update unit 146 updates the position transformation model 115 by using the corrected reference position. For example, the update unit 146 generates, using the corrected landmark two-dimensional position 113 and the landmark three-dimensional position 114, the position transformation model 115 by road camera calibration, thereby performing updating. A method for generating the position transformation model 115 will be described later.

The position/speed estimation unit 147 estimates an ortho position (three-dimensional coordinates) from position information of a mobile body in a photographed image. Specifically, the position/speed estimation unit 147 transforms the position information (the two-dimensional coordinates) of the mobile body detected by the object recognition unit 142 into the ortho position (the three-dimensional coordinates) by using the position transformation model 115. Further, the position/speed estimation unit 147 estimates (calculates) a speed of the mobile body from the position information of the mobile body (after the transformation) in a plurality of frame images.

The risk determination unit 148 determines a risk to a mobile body in a traffic environment based on the estimated ortho position and speed. For example, the risk determination unit 148 calculates, as risk information, a collision probability that the mobile body collides with external walls or another mobile body. Alternatively, the risk determination unit 148 may determine whether or not the collision probability is equal to or greater than a predetermined value and use a result of the determination as risk information.

The output unit 149 outputs risk information, which is a result of the determination made by the risk determination unit 148. For example, the output unit 149 outputs the risk information to a display apparatus (not shown) of the calibration system 100. Alternatively, the output unit 149 outputs the risk information to the display apparatus (not shown) connected via a network.

Note that each of the acquisition unit 141, the object recognition unit 142, the trajectory generation unit 143, the amount of positional deviation calculation unit 144, the correction unit 145, the update unit 146, the position/speed estimation unit 147, the risk determination unit 148, and the output unit 149 may be implemented by dedicated hardware. Further, some or all of the components of each unit may be implemented by a general-purpose or dedicated circuit (circuitry), a processor or the like, or a combination thereof. They may be formed by a single chip, or may be formed by a plurality of chips connected to each other through a bus. Some or all of the components of each unit may be implemented by a combination of the above-described circuit or the like and a program. Further, as the processor, a Central Processing Unit (CPU), a Graphics Processing Unit (GPU), a field-programmable gate array (FPGA), or the like may be used.

Further, when some or all of the components of the calibration system 100 are implemented by a plurality of information processing apparatuses, circuits, or the like, the plurality of information processing apparatuses, the circuits, or the like may be disposed in one place or arranged in a distributed manner. For example, the information processing apparatuses, the circuits, and the like may be implemented as a client-server system, a cloud computing system, or the like, or a configuration in which the apparatuses or the like are connected to each other through a communication network. Alternatively, the functions of the calibration system 100 may be provided in the form of Software as a Service (SaaS).

Further, the object recognition model 111 and the position transformation model 115 may be stored in a storage device external to the calibration system 100, and data may be input/output to/from the calibration system 100 by a storage system, a database system, or the like.

Figure 2:
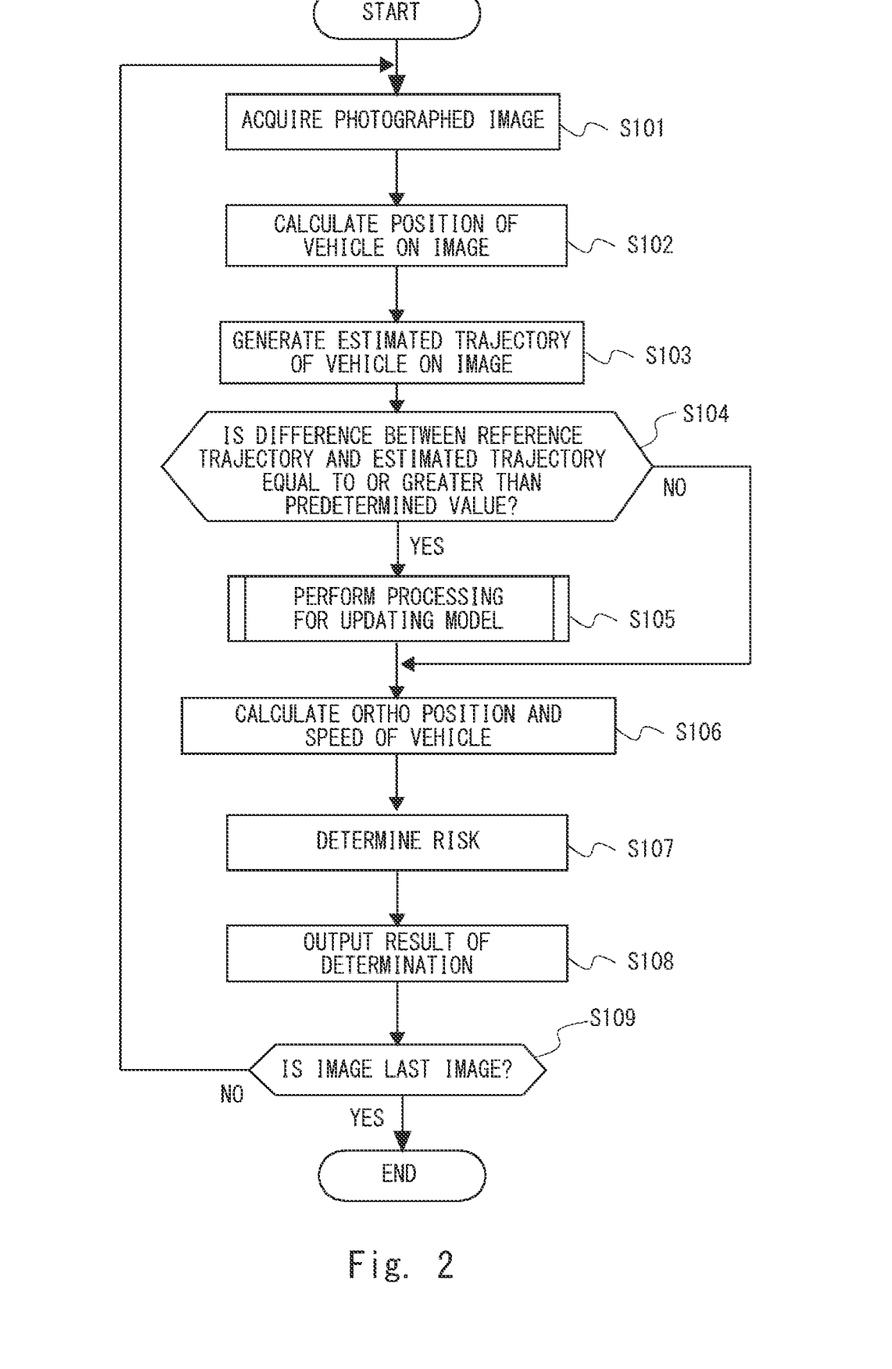
FIG. 2 is a flowchart showing a flow of processing for risk prediction according to the first embodiment.

FIG. 2 is a flowchart showing a flow of processing for risk prediction according to the first embodiment. First, the acquisition unit 141 acquires a photographed image from the imaging sensor 150 (S101). Next, the object recognition unit 142 calculates a position of a vehicle on the photographed image (S102). As described above, the object recognition unit 142 acquires position information of the vehicle (a mobile body) from the photographed image by using the object recognition model 111. Note that it is assumed that Steps S101 and S102 are performed at least twice before the next Step S103 is performed.

Next, the trajectory generation unit 143 generates an estimated trajectory of the vehicle on the image (S103). As described above, the estimated trajectory is a set of two-dimensional coordinates along a time series. Here, it is assumed that the estimated trajectory of a vehicle i is $T_i = \{(x_t, y_t)\}_{t=0}$. For example, coordinates $(x_{t1}, y_{t1})$ at a time t1 are connected to coordinates $(x_{t2}, y_{t2})$ at a next time t2, and the coordinates $(x_{t2}, y_{t2})$ are connected to coordinates $(x_{t3}, y_{t3})$ at a next time t3. Further, it is assumed that the reference trajectory 112 is $D = \{((x_t, y_t))\}_{t=0}, \ldots$. As described above, the reference trajectory 112 may be registered in advance in the storage unit 110. Alternatively, it may be an estimated trajectory generated several times earlier.

Here, the amount of positional deviation calculation unit 144 determines whether or not the difference between the reference trajectory 112 and the estimated trajectory is equal to or greater than a predetermined value (S104). Specifically, the amount of positional deviation calculation unit 144 calculates a distance d between the reference trajectory 112 and the estimated trajectory, where $d = \|T_i - D\|$ holds, and determines whether or not the distance d is equal to or greater than a threshold value $\tau$. Note that $T_i$ may be obtained by averaging the estimated trajectories of a plurality of vehicles for each lane. By doing the above, it is possible to make the estimated trajectory stable.

Then, if it is determined in Step S104 that the aforementioned difference is equal to or greater than the predetermined value, processing for updating a model is performed (S105).

Figure 3:
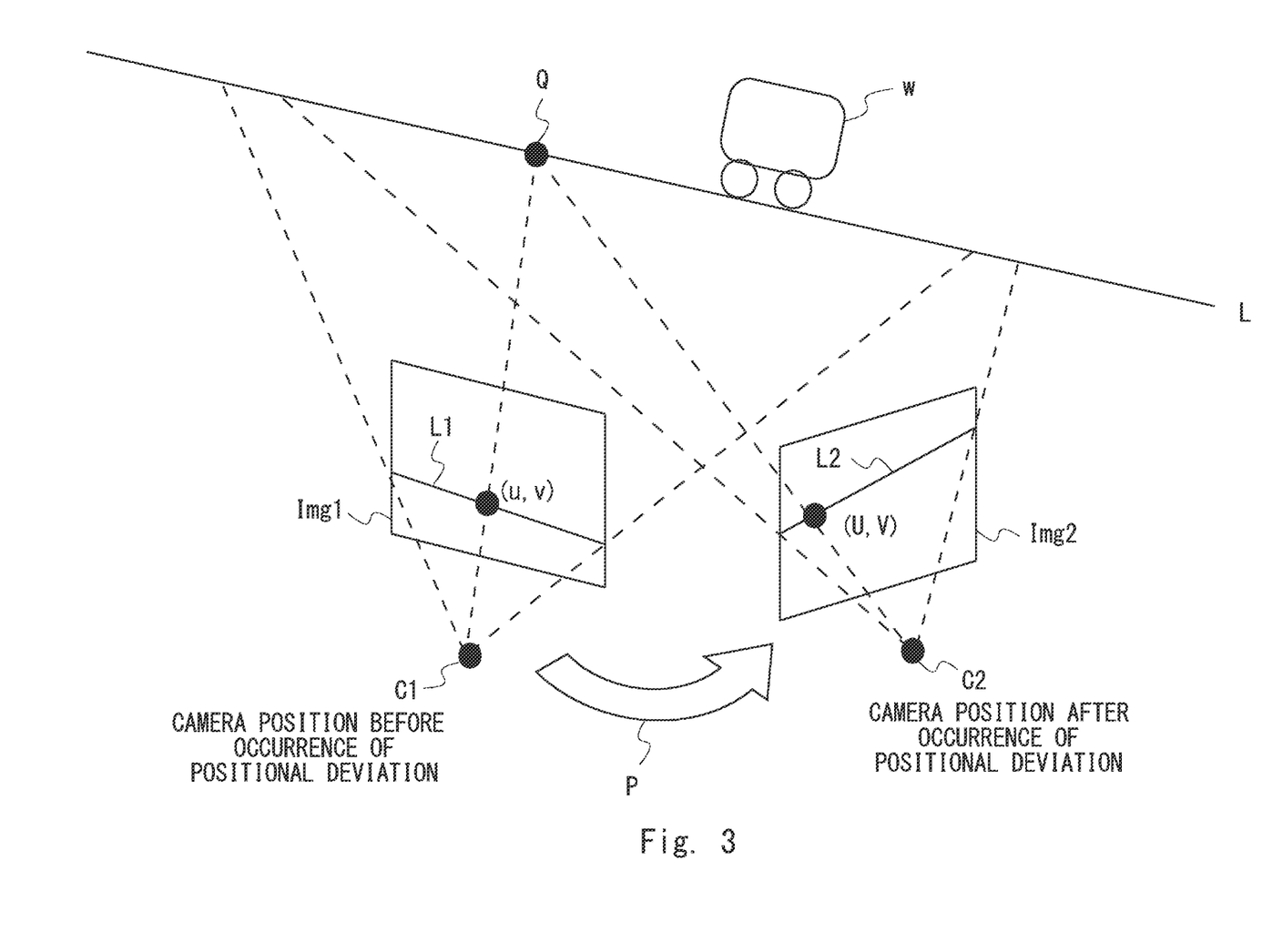
FIG. 3 is a diagram showing a relation between a camera position and a vehicle trajectory before and after the occurrence of a positional deviation according to the first embodiment.

Here, a relation between a camera position and a vehicle trajectory before and after the occurrence of a positional deviation will be described with reference to FIG. 3. First, it is assumed that a vehicle w is traveling on a trajectory L. Further, it is assumed that a landmark Q is located on the trajectory L. In this case, it is assumed that the camera (the imaging sensor 150) is installed at a camera position C1 before the occurrence of the positional deviation as, for example, an initial position, and has photographed a part of the trajectory L. At this time, an image Img1 is acquired. A reference trajectory L1 is a reference trajectory of the vehicle w in the image Img1. The position coordinates of the landmark Q in the image Img1 are (u, v). It is assumed that the position of the camera is then deviated to the camera position C2 due to an external factor and the like. Further, an image photographed by the camera at the camera position C2 is defined as an image Img2. An estimated trajectory L2 is an estimated trajectory of the vehicle w in the image Img2. The position coordinates of the landmark Q in the image Img2 are (U, V). Therefore, it can be considered that the two-dimensional position of the landmark Q has been subject to a transformation P from (u, v) to (U, V) due to the positional deviation of the camera.

Figure 4:
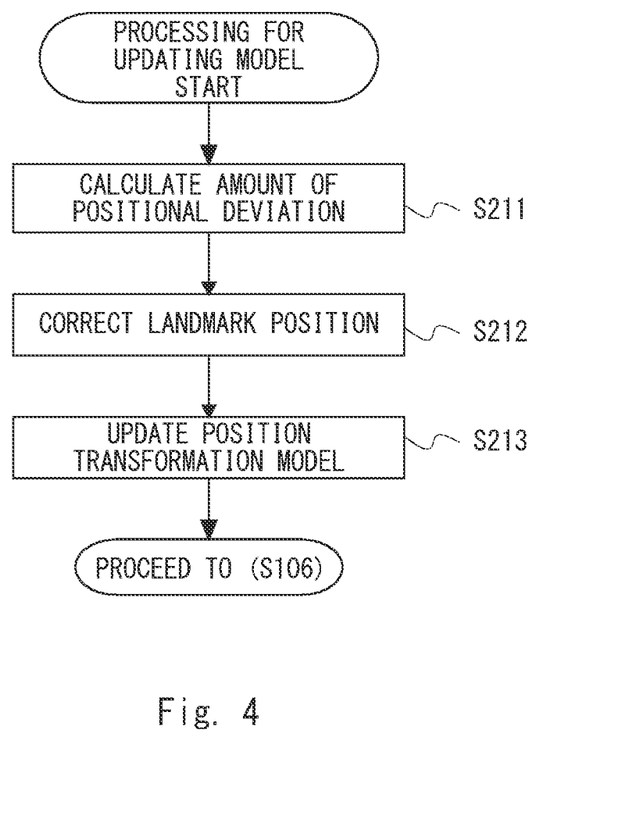
FIG. 4 is a flowchart showing a flow of processing for updating a model according to the first embodiment.

FIG. 4 is a flowchart showing a flow of the processing for updating a model according to the first embodiment. FIG. 4 shows Step S105 in detail. First, the amount of positional deviation calculation unit 144 calculates an amount of positional deviation of the imaging sensor 150 based on the reference trajectory 112 and the estimated trajectory (S211).

Here, an example in which the amount of positional deviation (the transformation P) of the camera is calculated from two trajectories will be described. It is assumed that coordinates of M points (M is a natural number equal to or greater than two) on a trajectory straight line L1 in the image Img1 (a two-dimensional image) photographed at the camera position C1 before the occurrence of the positional deviation are defined as follows.

$(u_i, v_i), i = 1, \ldots, M$

Further, coordinates of M points on a trajectory straight line L2 in the image Img2 photographed at the camera position C2 after the occurrence of the positional deviation are defined as follows.

$(U_i, V_i), i = 1, \ldots, M$

The transformation P of the two trajectories can be expressed as follows.

[Expression 1]

$$Pm = sM, m = \begin{pmatrix} u \\ v \\ 1 \end{pmatrix}, M = \begin{pmatrix} U \\ V \\ 1 \end{pmatrix}, P = \begin{pmatrix} p_{11} & p_{12} & p_{13} \\ p_{21} & p_{22} & p_{23} \\ p_{31} & p_{32} & 1 \end{pmatrix} \quad (1)$$

where s is a scale parameter, and, for example, s=1 may hold. Further, an x-coordinate U and a y-coordinate V on the trajectory straight line L2 can be defined as follows.

[Expression 2]

$$U = \frac{p_{11}u + p_{12}v + p_{13}}{p_{31}u + p_{32}v + 1}, \quad V = \frac{p_{21}u + p_{22}v + p_{23}}{p_{31}u + p_{32}v + 1} \quad (2)$$

Thus, U and V can be expressed as a function of a vector p. Therefore, an equation of the straight line L2 in the image Img2 is defined as follows.

[Expression 3]

$$\frac{U(p)}{a} + \frac{V(p)}{b} = 1, \quad p = \begin{pmatrix} p_{11} \\ \vdots \\ p_{32} \end{pmatrix} \quad (3)$$

Then, a point (u, v) on the straight line L1 in the image Img1 is mapped to the straight line L2 by the transformation P. Thus, the transformation P is a vector that minimizes the following function f.

[Expression 4]

$$\min_p f(p) \text{ where } f(p) = \sum_{u,v} \left(\frac{U(p)}{a} + \frac{V(p)}{b} - 1\right)^2 \quad (4)$$

where the range summed by Σ is the point (u, v) on the straight line L1 in the image Img1. This nonlinear minimization problem can be solved as follows by the steepest descent method.

[Expression 5]

$$\frac{\partial f(p)}{\partial p} = 2\sum_{u,v} \left(\frac{U(p)}{a} + \frac{V(p)}{b} - 1\right)\left(\frac{1}{a}\frac{\partial U(p)}{\partial p} + \frac{1}{b}\frac{\partial V(p)}{\partial p}\right) \quad (5)$$

[Expression 6]

$$\frac{\partial (UV)}{\partial p} = \frac{1}{p_{31}u + p_{32}v + 1}\begin{pmatrix} u & v & 1 & 0 & 0 & 0 & -u^2 & -uv \\ 0 & 0 & 0 & u & v & 1 & -uv & -v^2 \end{pmatrix}^T \quad (6)$$

[Expression 7]

$$p^{(j)} = p^{(j-1)} + h\frac{\partial f(p)}{\partial p} \quad (7)$$

where j is the number of iterations and h is a step size. Thus, $p^{(j)}$ is the j-th iteration value (the vector p). In this way, the amount of positional deviation calculation unit 144 can calculate the transformation P, which is the amount of positional deviation of the two trajectories.

Next, the correction unit 145 corrects the landmark position by using the transformation P (S212). Specifically, the correction unit 145 calculates corrected position coordinates of a landmark i by the following Expression 8.

[Expression 8]

$$Pm = sM, \quad m = \begin{pmatrix} u_i \\ v_i \\ 1 \end{pmatrix}, \quad M = \begin{pmatrix} U_i \\ V_i \\ 1 \end{pmatrix} \quad (8)$$

where m is a position vector of the landmark i before a correction is made, and M is a corrected position vector of the landmark i. Further, s is a scale parameter, and, for example, s=1 may hold.

Figure 5:
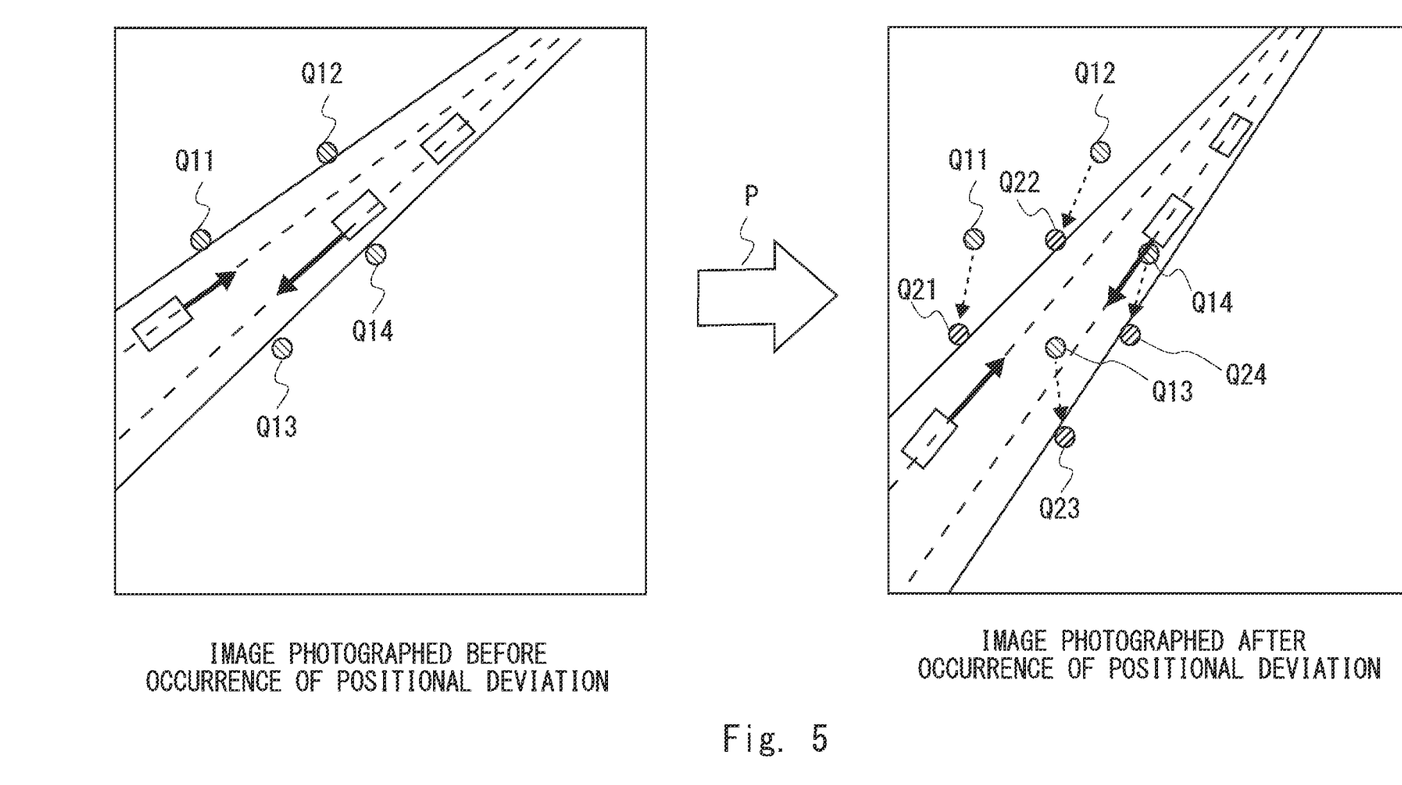
FIG. 5 is a diagram showing an example in which a landmark position is corrected according to the first embodiment.

FIG. 5 is a diagram showing an example in which the landmark position is corrected according to the first embodiment. The left part of FIG. 5 shows an image photographed before the occurrence of the positional deviation, and includes four landmark positions Q11, Q12, Q13, and Q14. After the landmark positions Q11 to Q14 are transformed (corrected) by the transformation P, the respective landmark positions have the correspondences as shown in the right part of FIG. 5. That is, the landmark position Q11 is corrected to a landmark position Q21, the landmark position Q12 is corrected to a landmark position Q22, the landmark position Q13 is corrected to a landmark position Q23, and the landmark position Q14 is corrected to a landmark position Q24. As described above, the correction of the landmark position improves the accuracy of recognition of a road shape even in the image photographed after the occurrence of the positional deviation. Accordingly, it also improves the accuracy of a (risk) determination as to whether or not the estimated trajectory of the vehicle is appropriate.

Referring back to FIG. 4, the description will be continued. The update unit 146 updates the position transformation model 115 by using the corrected landmark position and the landmark three-dimensional position 114 (S213). That is, the update unit 146 calculates a new homography matrix (position transformation model 115), and stores the calculated homography matrix in the storage unit 110. Here, a homography matrix H˜ can be expressed as follows.

[Expression 9]

$$\tilde{H}m = sM, \quad m = \begin{pmatrix} U_i \\ V_i \\ 1 \end{pmatrix}, \quad M = \begin{pmatrix} X_i \\ Y_i \\ 1 \end{pmatrix}, \quad \tilde{H} = \begin{pmatrix} \tilde{h}_{11} & \tilde{h}_{12} & \tilde{h}_{13} \\ \tilde{h}_{21} & \tilde{h}_{22} & \tilde{h}_{23} \\ \tilde{h}_{31} & \tilde{h}_{32} & 1 \end{pmatrix} \quad (9)$$

where m is a corrected position vector of the landmark i, and M is a position vector of the ortho position of the landmark i. Further, s is a scale parameter, and, for example, s=1 may hold.

Calibration using homography transformation from a position vector on a two-dimensional image to a position vector on an ortho image will be described hereinafter for the sake of simplicity. It is assumed that coordinates of N landmarks i (N is a natural number equal to or greater than two) on the two-dimensional image are defined as follows. $(x_i, y_i)$, i=1, . . . , N Further, coordinates of N landmarks i on the ortho image (the three-dimensional image) are defined as follows. $(X_i, Y_i)$, i=1, . . . , N That is, since $(X_i, Y_i)$ is a coordinate position on the real space of the landmark i, it is known by measurement or the like.

The coordinate relation between the two images can be expressed as follows.

[Expression 10]

$$Hm = sM, \; m = \begin{pmatrix} x_i \\ y_i \\ 1 \end{pmatrix}, \; M = \begin{pmatrix} X_i \\ Y_i \\ 1 \end{pmatrix}, \; H = \begin{pmatrix} h_{11} & h_{12} & h_{13} \\ h_{21} & h_{22} & h_{23} \\ h_{31} & h_{32} & 1 \end{pmatrix} \quad (10)$$

where H is a homography matrix. In Expression 10, m is a corrected position vector of the landmark i, and M is a position vector of the ortho position of the landmark i. Further, s is a scale parameter, and, for example, s=1 may hold.

Further, the homography matrix becomes the solution of the following simultaneous equations.

[Expression 11]

$$Ah = b \quad (11)$$

Here, A, h, and b can be expressed as follows.

[Expression 12]

$$A = \begin{pmatrix} x_1 & y_1 & 1 & 0 & 0 & 0 & -x_1 X_1 & -y_1 X_1 \\ 0 & 0 & 0 & x_1 & y_1 & 1 & -x_1 Y_1 & -y_1 Y_1 \\ & & & & & & & \\ x_i & y_i & 1 & 0 & 0 & 0 & -x_i X_i & -y_i X_i \\ 0 & 0 & 0 & x_i & y_i & 1 & -x_i Y_i & -y_i Y_i \\ & & & & & & & \\ x_N & y_N & 1 & 0 & 0 & 0 & -x_N X_N & -y_N X_N \\ 0 & 0 & 0 & x_N & y_N & 1 & -x_N Y_N & -y_N Y_N \end{pmatrix}, \quad (12)$$

$$h = \begin{pmatrix} h_{11} \\ \vdots \\ h_{32} \end{pmatrix}, \; b = \begin{pmatrix} X_1 \\ Y_1 \\ \vdots \\ X_i \\ Y_i \\ \vdots \\ X_N \\ Y_N \end{pmatrix}$$

where A and b are known as described above, and h is an unknown vector.

The unknown vector h is calculated as a norm least square solution as follows.

[Expression 13]

$$h = (A^T A)^+ A^T b \quad (13)$$

where + is a generalized inverse matrix. Note that the calculation of the homography matrix may be referred to as calibration.

Referring back to FIG. 2, the description will be continued. After Step S105, or in the case of NO in Step S104, the position/speed estimation unit 147 calculates an ortho position and a speed of the vehicle (S106). Specifically, the position/speed estimation unit 147 calculates, by the position transformation model 115, the ortho position from the position of the vehicle calculated in Step S102. In this case, the position/speed estimation unit 147 may calculate positions of a plurality of vehicles in the photographed image.

Further, when two or more ortho positions for one vehicle have been calculated from two or more images, the position/speed estimation unit 147 calculates the speed of the one vehicle from the two or more ortho positions for the one vehicle.

Then, the risk determination unit 148 determines a risk of danger to each vehicle in the traffic environment based on the estimated ortho position and speed (S107). After that, the output unit 149 outputs a result of the determination (S108).

Then, the control unit 140 determines whether or not the image acquired in Step S101 is the last image (S109). If there is a next input image, the process returns to Step S101, and after that, processing similar to the above-described processing is performed. If the control unit 140 determines that the image acquired in Step 101 is the last image, the process ends.

As described above, according to this embodiment, it is possible to improve the accuracy of estimation of a position of the mobile body based on the image photographed by the installed camera.

As described in the SUMMARY, an infrastructure camera has a problem that since a landmark position in an image is changed due to a mechanical deviation caused by the influence from outside, the accuracy of estimation of the position is reduced. At this time, for example, the change of the image can be detected by a difference between this image and the background image or by alignment. However, it is difficult to calculate an amount of positional deviation of the camera when the positional deviation is largely caused by external factors, such as when a displacement of the camera and a change of illumination occur at the same time.

It should be noted that the advance of deep learning has enabled object recognition robust to illumination variations. Therefore, in this embodiment, an estimated trajectory of the vehicle in the image is calculated using a result of the object recognition, and when the difference between the reference trajectory and the estimated trajectory before the occurrence of the positional deviation is equal to or greater than a predetermined value, the amount of positional deviation between these trajectories is calculated as a transformation matrix. Then, a landmark position set before the occurrence of the positional deviation is corrected by using the transformation matrix, and the position transformation model is updated using the corrected two-dimensional position of the landmark and the three-dimensional position of the landmark set in advance, whereby calibration is performed. By this configuration, it is possible to accurately estimate the position of the mobile body in the image photographed after the occurrence of the positional deviation. Therefore, it is possible to, for example, predict an accident with high accuracy, and thus it is possible to prevent the accident from occurring. Note that the calibration method according to this embodiment refers to at least Steps S101 to S105.

Second Embodiment

A second embodiment is a modified example of the first embodiment. In the first embodiment, the calibration system is implemented by a camera apparatus alone. In contrast, in the second embodiment, a computer external to the camera apparatus performs, for example, processing for risk prediction including the calibration method.

Figure 6:
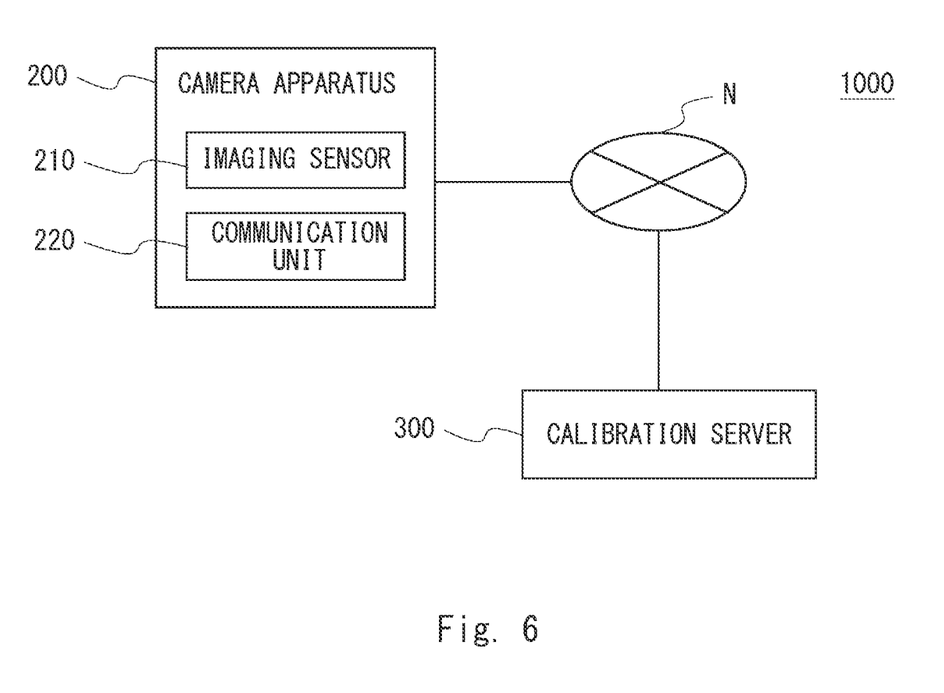
FIG. 6 is a block diagram showing a configuration of a calibration system according to a second embodiment.

FIG. 6 is a block diagram showing a configuration of a calibration system 1000 according to the second embodiment. The calibration system 1000 includes a camera apparatus 200 and a calibration server 300. The camera apparatus 200 and the calibration server 300 are connected via a network N. Note that the network N is a communication line network such as the Internet, an intranet, a mobile phone network, and a Local Area Network (LAN).

The camera apparatus 200 includes an imaging sensor 210 and a communication unit 220. Like the imaging sensor 150 described above, the imaging sensor 210 photographs a predetermined traffic environment. Further, the imaging sensor 210 outputs the photographed image to the communication unit 220.

The communication unit 220 is an interface through which the camera apparatus 200 communicates with the outside. The communication unit 220 transmits the photographed image to the calibration server 300 via the network N.

The calibration server 300 is composed of one or more information processing apparatuses that analyze photographed images sequentially input, and output results of the determination of a risk to a vehicle or the like. Note that the configuration of the calibration server 300 is the same as that shown in FIG. 1 except that the imaging sensor 150 is not included, and thus the illustration thereof is omitted.

The calibration server 300 sequentially acquires photographed images from the camera apparatus 200 via the network N. Then the calibration server 300 performs processing on the acquired photographed images in a manner similar to that in the case of the calibration system 100.

As described above, this embodiment can provide advantageous effects similar to those in the case of the first embodiment.

Other Embodiments

Note that the present disclosure is not limited to the above-described embodiments and may be modified as appropriate without departing from the spirit of the present disclosure. For example, although the present disclosure is described as a hardware configuration in the above-described embodiments, the present disclosure is not limited thereto. In the present disclosure, any processing can also be implemented by causing a Central Processing Unit (CPU) to execute a computer program.

In the above-described examples, the program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), and semiconductor memories (such as mask ROM, PROM (programmable ROM), EPROM (erasable PROM), flash ROM, RAM (random access memory), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A calibration system comprising:
a processor configured to:
  store a reference trajectory of a mobile body in an image of a predetermined traffic environment photographed by an imaging sensor and a reference position in the image, the reference position being a fixed position in the traffic environment;
  acquire a plurality of images of the traffic environment that are sequentially photographed;
  generate an estimated trajectory of the mobile body based on position information of the mobile body detected from the plurality of images;
  calculate an amount of positional deviation of the imaging sensor based on the reference trajectory, which is captured in a first image where the imaging sensor is in a first position in which the imaging sensor is not deviated from an initial installation position of the imaging sensor, and the estimated trajectory, which is captured in a second image where the imaging sensor is in a second position in which the imaging sensor has a possibility of being deviated from the initial installation position;
  correct the reference position by using the amount of positional deviation; and
  update a position transformation model for transforming a two-dimensional position in the image into a three-dimensional position by using the corrected reference position.

2. The calibration system according to claim 1, wherein the processor is configured to calculate, when a difference between the reference trajectory and the estimated trajectory is equal to or greater than a predetermined value, the amount of positional deviation.

3. The calibration system according to claim 1, wherein the processor is configured to calculate a transformation formula for transforming the reference trajectory into the estimated trajectory as the amount of positional deviation.

4. The calibration system according to claim 1, wherein the processor is configured to:
perform object recognition on each of the plurality of images to thereby calculate time-series data of the position information of the mobile body, and
generate the estimated trajectory from the time-series data.

5. A calibration method comprising:
an acquisition step of acquiring, by a computer, a plurality of images of a predetermined traffic environment that are sequentially photographed by an imaging sensor;
a generation step of generating, by the computer, an estimated trajectory of a mobile body based on position information of the mobile body detected from the plurality of images;
a calculation step of calculating, by the computer, an amount of positional deviation of the imaging sensor based on a reference trajectory of the mobile body in an image of the traffic environment photographed by the imaging sensor, which is captured in a first image where the imaging sensor is in a first position in which the imaging sensor is not deviated from an initial installation position of the imaging sensor, and the estimated trajectory, which is captured in a second image where the imaging sensor is in a second position in which the imaging sensor has a possibility of being deviated from the initial installation position;

a correction step of correcting, by the computer, a reference position in the image by using the amount of positional deviation; and an update step of updating, by the computer, a position transformation model for transforming a two-dimensional position in the image into a three-dimensional position by using the corrected reference position.

6. The calibration method according to claim 5, wherein the calculation step comprises calculating, when a difference between the reference trajectory and the estimated trajectory is equal to or greater than a predetermined value, the amount of positional deviation.

7. The calibration method according to claim 5, wherein the calculation step further comprises calculating a transformation formula for transforming the reference trajectory into the estimated trajectory as the amount of positional deviation.

8. The calibration method according to claim 5, wherein the generation step comprises:

performing object recognition on each of the plurality of images, thereby calculating time-series data of the position information of the mobile body; and generating the estimated trajectory from the time-series data.

9. A non-transitory computer readable medium storing a calibration program for causing a computer to execute:

an acquisition step of acquiring a plurality of images of a predetermined traffic environment that are sequentially photographed by an imaging sensor;

a generation step of generating an estimated trajectory of a mobile body based on position information of the mobile body detected from the plurality of images;

a calculation step of calculating an amount of positional deviation of the imaging sensor based on a reference trajectory of the mobile body in an image of the traffic environment photographed by the imaging sensor, which is captured in a first image where the imaging sensor is in a first position in which the imaging sensor is not deviated from an initial installation position of the imaging sensor, and the estimated trajectory, which is captured in a second image where the imaging sensor is in a second position in which the imaging sensor has a possibility of being deviated from the initial installation position;

a correction step of correcting a reference position in the image by using the amount of positional deviation; and an update step of updating a position transformation model for transforming a two-dimensional position in the image into a three-dimensional position by using the corrected reference position.

* * * * *